US006963440B2

(12) United States Patent
Martin et al.

(10) Patent No.: US 6,963,440 B2
(45) Date of Patent: Nov. 8, 2005

(54) SYSTEM AND METHOD FOR DRIVING A LIGHT DELIVERY DEVICE

(75) Inventors: Eric T. Martin, Corvallis, OR (US); Adam L Ghozeil, Corvallis, OR (US); Matthew Gelhaus, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 60 days.

(21) Appl. No.: 10/779,260

(22) Filed: Feb. 13, 2004

(65) Prior Publication Data

US 2005/0179979 A1 Aug. 18, 2005

(51) Int. Cl.[7] ............................................ G02B 26/00
(52) U.S. Cl. .................................... 359/290; 359/291
(58) Field of Search ............................. 359/238, 249, 359/290, 291, 292, 295, 296, 230, 214, 224, 359/239, 297; 345/204

(56) References Cited

U.S. PATENT DOCUMENTS

| | | | | |
|---|---|---|---|---|
| 5,323,002 | A | 6/1994 | Sampsell et al. | |
| 5,842,088 | A | 11/1998 | Thompson | |
| 6,014,202 | A | 1/2000 | Chapnik et al. | |
| 6,188,427 | B1 | 2/2001 | Anderson et al. | |
| 6,479,811 | B1 | 11/2002 | Kruschwitz et al. | |
| 6,574,043 | B2 | 6/2003 | Ramanujan | |
| 6,618,185 | B2 | 9/2003 | Sandstrom | |
| 6,788,842 | B1 * | 9/2004 | Sink et al. | 385/18 |
| 6,809,851 | B1 * | 10/2004 | Gurcan | 359/290 |
| 2002/0196245 | A1 | 12/2002 | Markis | |
| 2003/0081303 | A1 | 5/2003 | Sandstrom et al. | |

FOREIGN PATENT DOCUMENTS

| | | | |
|---|---|---|---|
| EP | 0791863 | A2 | 8/1997 |
| EP | 0791863 | A3 | 5/1998 |
| EP | 0791863 | B1 | 10/2001 |
| EP | 1143287 | A2 | 10/2001 |
| EP | 1310906 | A1 | 5/2003 |
| WO | WO03/023494 | | 3/2003 |

* cited by examiner

*Primary Examiner*—Hung Xuan Dang
*Assistant Examiner*—Tuyen Tra

(57) ABSTRACT

A light delivery device defining an optical path with a feedback device is disclosed. The feedback device dispatches actual illumination characteristics of the light delivery device to a control system, which compares the actual illumination characteristics with desired illumination characteristics to determine an offset for driving the light delivery device.

35 Claims, 8 Drawing Sheets

SYSTEM AND METHOD FOR DRIVING A LIGHT DELIVERY DEVICE

BACKGROUND

Diffractive based light (DLD) devices provide an optical output having a desired frequency or color based on a voltage input into the DLD device. To provide the desired frequency or color, DLD devices generally utilize a plurality of optical modulation elements arranged in an array of rows and columns. A light source projects light onto the DLD device, which in turn, only reflects the desired frequency or color. An analog voltage is supplied to each discrete element to cause that element to reflect the particular desired frequency of light.

When DLD devices are operated under normal conditions, the array of optical modulation elements can change in any one of a number of different ways. For example, thermal heating caused by the illumination source can result in expansion of the array, which may cause the array to reflect a different frequency or color of light than what was originally desired. Also, general changes such as the size or shape of the array or mechanical characteristics of the DLD structures may change over time. This type of change also may result in the array reflecting a different frequency or color of light than desired. The present embodiments were developed in light of these and other drawbacks.

BRIEF DESCRIPTION OF THE DRAWINGS

The present embodiments will now be described, by way of example, with reference to the accompanying drawings, in which.

DETAILED DESCRIPTION

The present embodiments provide a device that reads an actual frequency of light of the DLD device and then compares that actual frequency to a target or desired output frequency of the light from the DLD device. Once the actual frequency is compared to the target frequency, a difference in frequencies is determined and the DLD is adjusted to output a frequency closer to the target frequency. By this way, the DLD device is offset and adjusted for changes in the optical modulation elements using a feedback mechanism.

Figure 1:
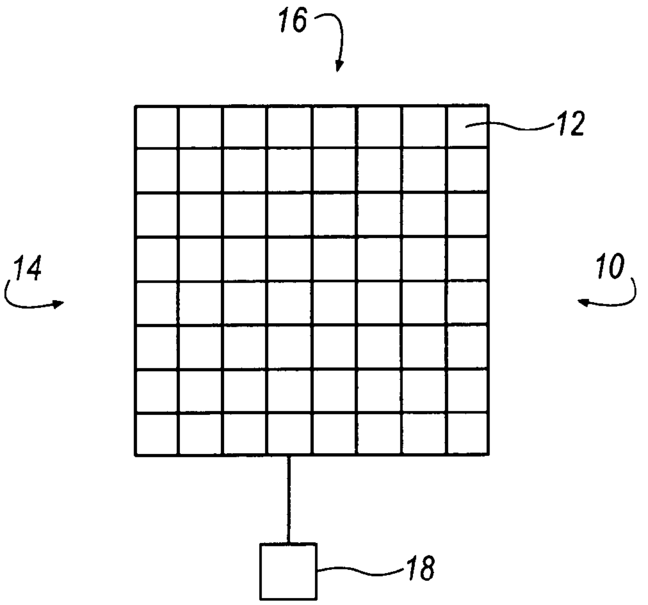
FIG. 1 is a schematic view of an embodiment of an array according to an aspect of the present embodiments.

Referring now to FIG. 1, an array 10 is shown as generally including a plurality of optical modulation elements 12 arranged in rows 14 and columns 16. Array driver circuitry 18 operationally connects to the array 10 to addressably provide analog voltage or charge to each of the optical modulation elements 12 to effectuate a colored illumination response from each of the optical modulation elements 12 (as will be described in greater detail). The optical modulation elements 12 of the array 10 are constructed to reflect a desired frequency or color of light based on a voltage provided to each of the optical modulation elements 12 by the array driver circuitry 18. For example, if it is desired for one of the optical modulation elements 12 to reflect only the color red, then the array driver circuitry 18 provides that optical modulation element 12 with an analog voltage sufficient to cause that optical modulation element 12 to reflect only the frequency of light associated with the color red. This will be discussed in greater detail below.

The array driver circuitry 18 can instruct each of the optical modulation elements 12 in the array 10 to reflect specific colors in order to generate a desired color display image. It should also be noted that, although the present embodiments are described with reference to optical modulation elements 12 of the array 10, the present embodiment is applicable to any display device.

Figure 2:
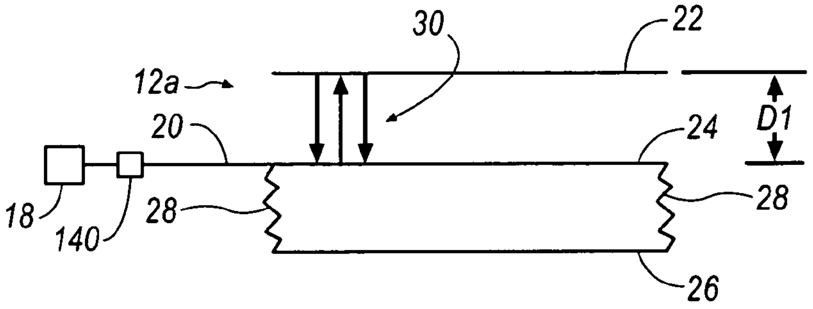
FIG. 2 is a schematic view of an embodiment of an optical modulation element according to an aspect of the present embodiments.

FIG. 2 illustrates a cross-sectional view of an exemplary optical modulation element 12*a* that may comprise the optical modulation elements 12 in FIG. 1. Optical modulation element 12*a* may be a MEM (Micro Electrical Mechanical) device used to allow certain light waves having a desired frequency to exit from the MEM to thereby generate an illuminated response at a desired color. The optical modulation element 12*a* includes a semitransparent outer plate 22, reflective middle plate 24 and a lower plate 26. Springs 28 are disposed between reflective middle plate 24 and lower plate 26. The reflective middle plate 24 of each element 12*a* is connected to a corresponding tap 20. A switch circuit 140 is positioned at some juncture along each tap 20 as will be discussed further below. The lower plate 26 is connected to another electrical potential that is different from that supplied by array driver circuitry 18, which in one embodiment is ground potential. In other embodiments, the polarity may be reversed from that shown herein.

In FIG. 2, outer plate 22 is shown separated from middle plate 24 by distance D1. Functionally, white light passes through outer plate 22 from illumination source 42 (as will be discussed in connection with FIG. 3) and is reflected by middle plate 24. The light waves 30 reflected from middle plate 24 through outer plate 22 comprise the output of each of the optical modulation elements 12*a* of the voltage driven array 10. The light waves 30 reflected from middle plate 24 and output through outer plate 22 consists of light having a single frequency (a natural frequency) that is dependent upon the distance D1 between the outer plate 22 and the middle plate 24. Reflected light waves having frequencies other than the natural frequency associated with distance D1 are eliminated by destructive interference that occurs between middle plate 24 and outer plate 22 before they are output through the outer plate 22. This destructive interference is accomplished by bouncing light between the reflective middle plate 24 and semi-reflective properties of outer plate 22. As a result, the light that survives this bouncing between the outer plate 22 and the middle plate 24 is that which has a natural frequency of light defined by D1, as will be readily understood by one skilled in the art. Accordingly, the output of each optical modulation element 12*a* is correlated to the distance D1 between the outer plate 22 and the middle plate 24.

Figure 2A:
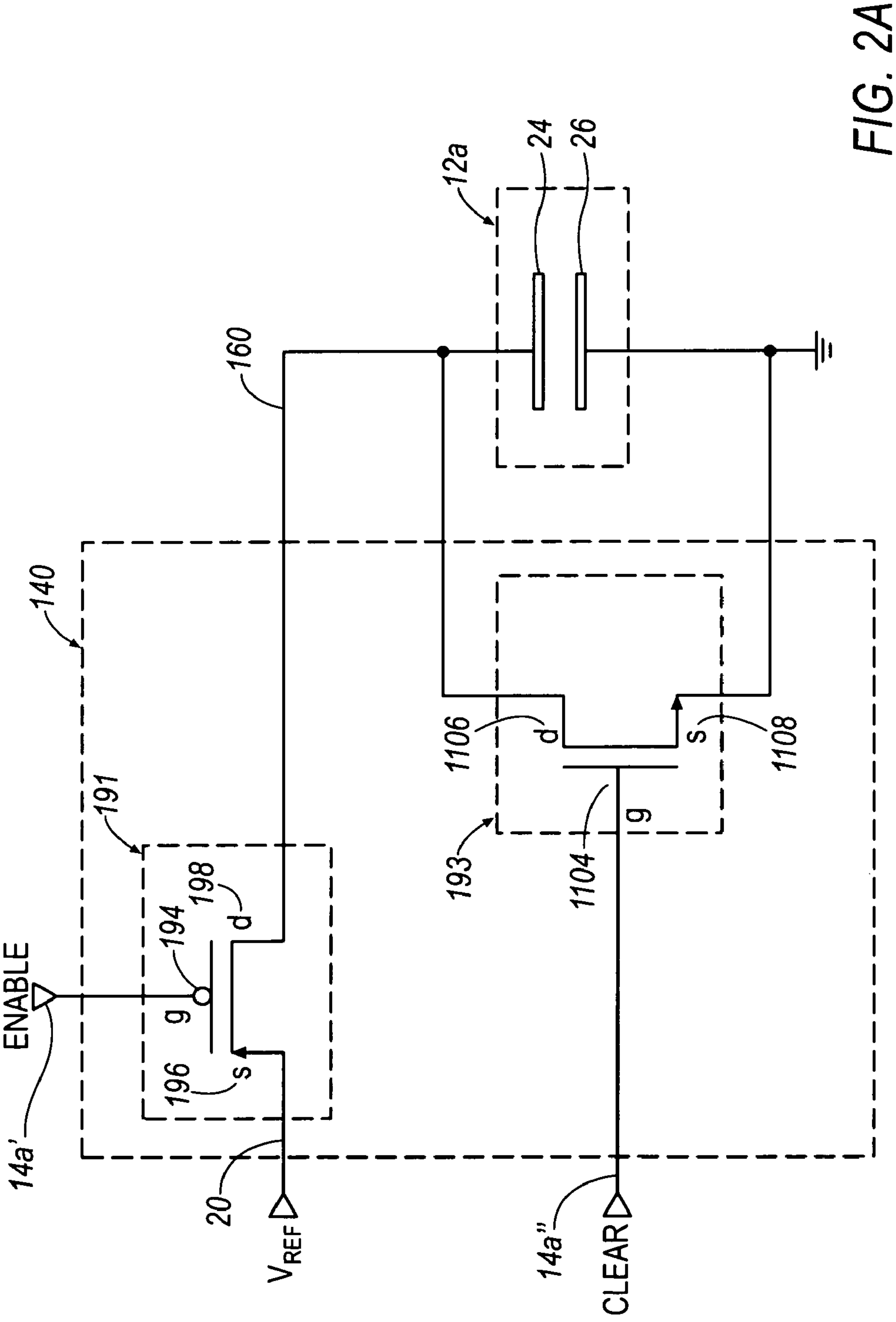
FIG. 2A is a schematic view of an embodiment of a switch circuit according to an aspect of the present embodiments.

In FIG. 2A, switch circuit 140 is described in greater detail. The switch circuit 140 includes a first switch 191 and a second switch 193. For each of the rows 14, paths 14*a*', 14*b*' . . . (hereinafter referred to as 14') provide an ENABLE signal. Likewise, for each of the rows 14, paths 14*a*", 14*b*" . . . (hereinafter referred to as 14") provide a CLEAR signal. In some embodiments, the ENABLE signal and CLEAR signal are provided by an electronic controller (not shown). The first switch 191 receives a selected reference voltage ($V_{REF}$) at source 196 via the taps 20 (See FIGS. 1 and 2) and the ENABLE signal at gate 194 via path 14'. Drain 198 is coupled to reflective middle plate 24 of illumination element 12*a* via path 160. Second switch 193 is coupled across illumination element 12*a* with drain 1106 coupled to reflective middle plate 24 and source 1108 coupled to lower plate 26 via ground. Second switch 193 receives the CLEAR signal at gate 1104 via path 14".

Switch circuit 140 operates as described below to cause a charge differential between reflective middle plate 24 and lower plate 26. Initially, the ENABLE signal is at a "high" level, the CLEAR signal is at a "low" level, and the reference voltage is at a selected voltage level. As a result, first switch 191 and second switch 193 are both off. The CLEAR signal is then changed from a "low" level to a "high" level, causing second switch 193 to turn on and pull reflective middle plate 24 to ground, thereby removing any charge differential between middle plate 24 and lower plate 26. The CLEAR signal is then returned to the "low" level causing second switch 193 to again turn off.

The ENABLE signal is then changed from the "high" level to a "low" level, causing first switch 191 to turn on, to thereby apply the reference voltage to reflective middle plate 24 and cause a desired charge to accumulate on reflective middle plate 24 and lower plate 26, and thereby set a gap distance between reflective middle plate 24 and lower plate 26. The ENABLE signal stays "low" for a predetermined duration before returning to the "high" level, causing first switch 191 to again turn off, decoupling the reference voltage from illumination element 12*a*. At this point, the illumination element 12*a* is isolated from $V_{REF}$, and charge can no longer flow. The predetermined duration is shorter than a mechanical time constant of illumination element 12*a*, resulting in the reflective middle plate 24 and lower plate 26 appearing to be substantially "fixed" during the predetermined duration, so that the stored charge can be calculated without having to compensate for a changing distance between the reflective middle plate 24 and a lower plate 26.

Figure 2B:
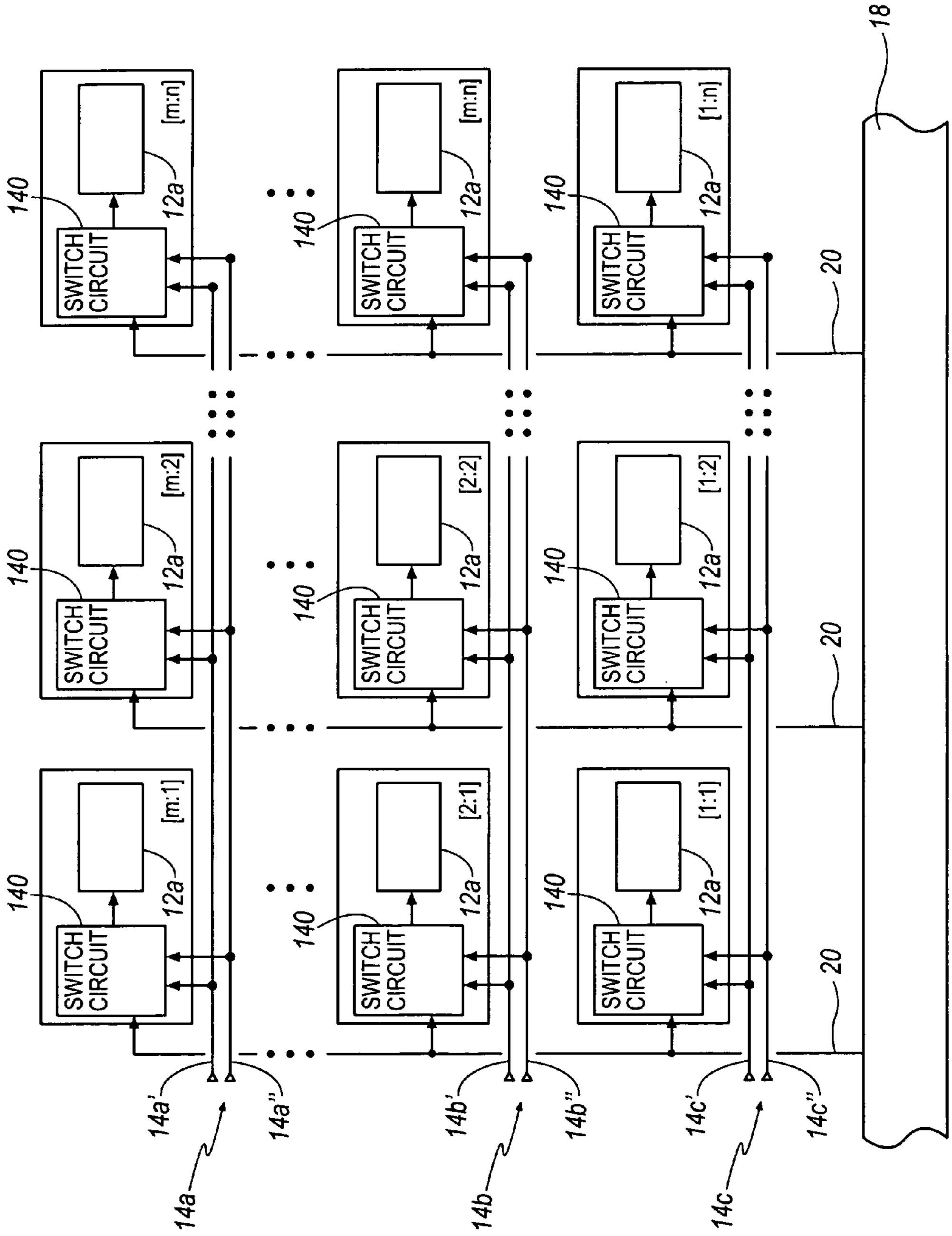
FIG. 2B is a schematic view of an embodiment of an array according to an aspect of the present embodiments.

FIG. 2B is a block diagram illustrating an exemplary embodiment of the switch circuit 140 in conjunction with the present embodiments. Each illumination element 12*a* includes a switch circuit 140.

Each switch circuit 140 is configured to control the magnitude of a stored charge differential between middle plate 24 and lower plate 26 of its associated illumination element 12*a* to thereby control the associated distance between reflective middle plate 24 and lower plate 26. As discussed above, the distance between reflective middle plate 24 and lower plate 26 directly affects the color output from the illumination element 12*a*. Each row 14 of the array 10 (See FIG. 1) receives a separate CLEAR signal from path 14" and ENABLE signal from path 14' with all switch circuits 140 of a given row receiving the same CLEAR and ENABLE signals. Each column of the array 10 receives a separate reference voltage ($V_{REF}$) from the taps 20.

To store, or "write", a desired charge to each reflective middle plate 24, a reference voltage having a selected value is provided to each of the columns 16 via taps 20. As described herein below, the reference voltage provided to each element 12*a* may be different. The CLEAR signal for the given row is then "pulsed" for a fixed duration to cause each of the switch circuits 140 of the given row to remove, or CLEAR, any potential stored charge from its associated illumination element 12*a*. The ENABLE signal from path 14' for the given row 14 is then "pulsed" to cause each switch circuit 140 of the given row to apply its associated reference voltage to its associated reflective middle plate 24. As a result, a stored charge having a desired magnitude based on the value of the applied reference voltage is stored on the reflective middle plate 24 to thereby set the gap distance between reflective middle plate 24, and lower plate 26, based on the desired magnitude of the stored charge. This procedure is repeated for each row of the array 10 to "write" a desired charge to each illumination element 12*a* of the array 10.

The distance D1 between the outer plate 22 and the middle plate 24 may be intentionally adjusted by the array driver circuitry 18 to allow light waves of different frequencies to emerge from the array element by applying different driving voltages or electrical charges to the reflective middle plate 24. In this way, the controller can cause each of the optical modulation elements 12*a* to allow a desired frequency of light (i.e., a desired color) to exit from the optical modulation elements 12*a*.

Figure 3:
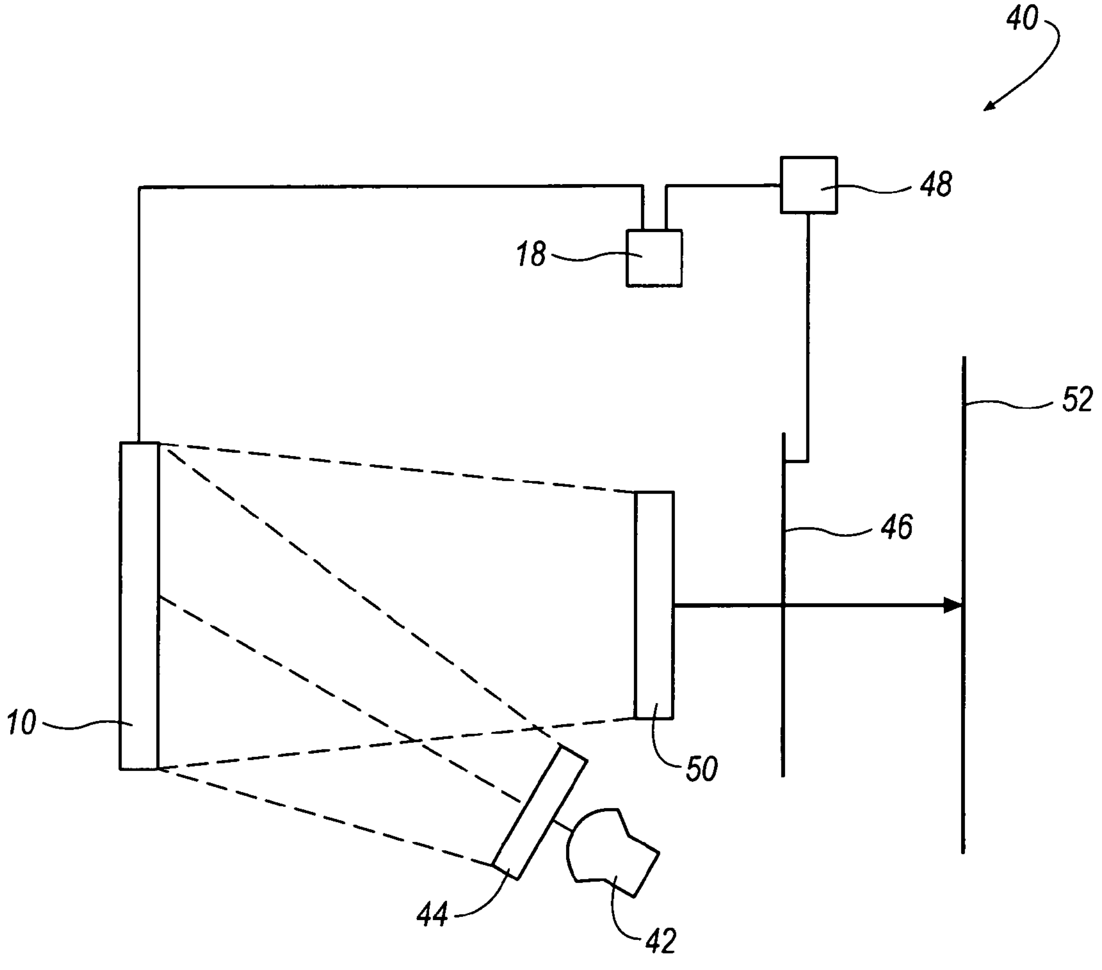
FIG. 3 is a schematic view of an embodiment of an optical display device according to an aspect of the present embodiments.

Referring now to FIG. 3, the array 10 of optical modulation elements 12*a* (FIG. 1) is shown and described in conjunction with components of a light delivery device 40. The light delivery device 40 can be any device for delivering light. In one embodiment, the light delivery device 40 includes an array 10, an illumination source 42, and a feedback device 46. The optical modulation element 12*a* and illumination source 42 generally define an optical path along which the feedback device 46 may be positioned. It should also be noted that additional elements may be positioned along the optical path such as other optical modulation elements 12*a*, other array's 10, or other suitable devices.

In one embodiment, the light delivery device 40 is a device for displaying images generated by the array 10 on a screen 52 or other suitable medium. Examples of the light delivery device 40 include digital overhead projectors, display screens and the like. One skilled in the art will readily recognize that the light delivery device 40 may be a different device for displaying information generated by a single optical modulation element 12*a* or an entire array 10 from that described in the present embodiment.

In one embodiment, the light delivery device 40 includes an illumination source 42, optical focusing elements 44 and 50, feedback device 46 and calibration control 48. A screen 52 or other medium for display is provided to allow images generated by the array 10 to be displayed thereon. The illumination source 42 can be any standard light source such as a light bulb or other suitable means for generating and projecting white light. The optical focus elements 44 and 50 may include lenses, prisms, mirrors and other suitable optics needed to capture light and focus it in a particular direction. It should be noted that both the optical focus elements 44 and 50 as well as the illumination source 42 are elements well-known and understood in the relevant art. Accordingly, the skilled artisans will readily recognize that many of these features may be repositioned in the light delivery device 40 or even eliminated altogether.

In operation, the illumination source 42 projects light through focusing element 44, which appropriately directs and focuses the light generated by illumination source 42 onto array 10. As described above, the outer plate 22 and reflective middle plate 24 of each optical modulation element 12*a* of the array 10 operate to cancel all frequencies of light by destructive interference, except that which is desired to be projected toward screen 52. Each modulation element 12*a* transmits the corresponding desired frequency of light from array 10, through focusing element 50, which then focuses and directs the light onto screen 52.

Feedback device 46 is shown schematically as being located in the path of light that exists between the focusing element 50 and the screen 52. The feedback device 46 operates to capture or sample at least some of the light projected from array 10 to screen 52. Therefore, it will be understood by one skilled in the art that the feedback device 46 may be located at any position between the array 10 and the screen 52. For purposes of illustration, however, the feedback device 46 is shown as being positioned between focusing element 50 and a screen 52. Example embodiments of the feedback device 46 will be described in greater detail below.

In an aspect of the embodiment, the feedback device 46 is a device which measures both the frequency and intensity of light projected by array 10. Such devices are readily known and understood by one skilled in the art. The feedback device 46 samples the intensity and frequency of light projected by array 10 and then feeds an electronic signal representing these characteristics to calibration control 48. Feedback device 46 may be translucent to allow the light to be passed therethrough or can be a device that captures only a portion of the projected light. One skilled in the art will readily recognize variations and modifications to the above discussed theme.

Calibration control 48 is connected to feedback device 46 to receive electrical signals representing the intensity and frequency of light gathered by the feedback device 46. Typically, the frequency of light projected by the array 10 and measured by the feedback device 46 will be spread over a certain frequency range. For example, if each of the optical modulation elements of the array 10 is instructed by array driver circuitry 18 to project a frequency of light corresponding to red, the actual projected light will be within a particular frequency range, including frequencies above and below the desired “red” frequency. There are many reasons for this frequency range, including the fact that numerous individual optical modulation elements 12*a* are actually causing the absorption of certain frequencies of the light.

Therefore, by providing intensity information in addition to frequency information of the projected light, the calibration control 48 is able to determine the middle of the frequency range, where the intensity is greatest. The calibration control 48 then sets this middle frequency value as the frequency value of the array 10. Of course, it will be understood that the intensity is not needed to be measured by the feedback device 46, and instead, calibration control 48 can use only the frequency information of the projected light to determine the mean frequency by simply averaging or conducting some other mathematical analysis of the frequency range.

In addition to receiving information from feedback device 46, the calibration control 48 also receives information from array driver circuitry 18. The information received from array driver circuitry 18 is the actual frequency value that the optical modulation elements 12*a* of the array 10 are intended to produce. For example, the array driver circuitry 18 in the above example is driving each of the optical modulation elements 12*a* of the array 10 with a voltage that has been predetermined to elicit a red response from the limitation elements 12*a*.

The information sent from the array driver circuitry 18 to the calibration control 48 is represented by a digital signal. For example, if the optical modulation elements 12*a* of array 10 are intended to be driven at a frequency corresponding to red, then a digital signal representing this value is dispatched to calibration control 48. Calibration control 48 is then able to compare the intended frequency with its determined actual frequency and to thereby determine an offset which the array driver circuitry 18 needs to drive the optical modulation elements 12*a* to obtain the desired frequency output from the array 10. Once determined by calibration control 48, a digital signal representing the determined offset is dispatched from calibration control 48 to the array driver circuitry 18 to allow the array driver circuitry 18 to offset the voltage it supplies to the optical modulation elements 12*a* for that particular color.

Figure 3A:
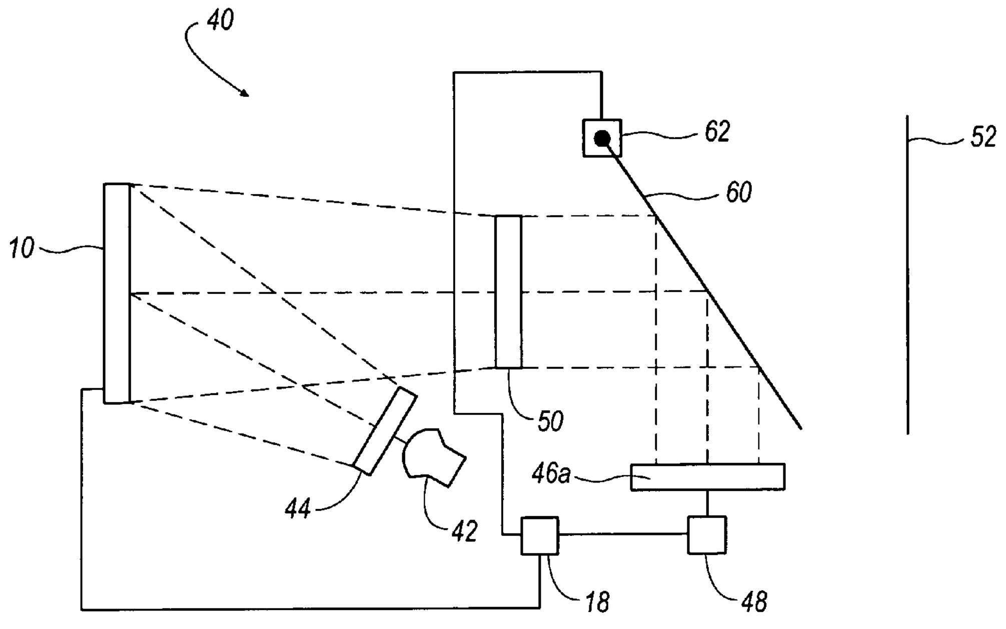
FIG. 3A is a schematic view of an embodiment of an optical display device according to an aspect of the present embodiments.
Figure 3B:
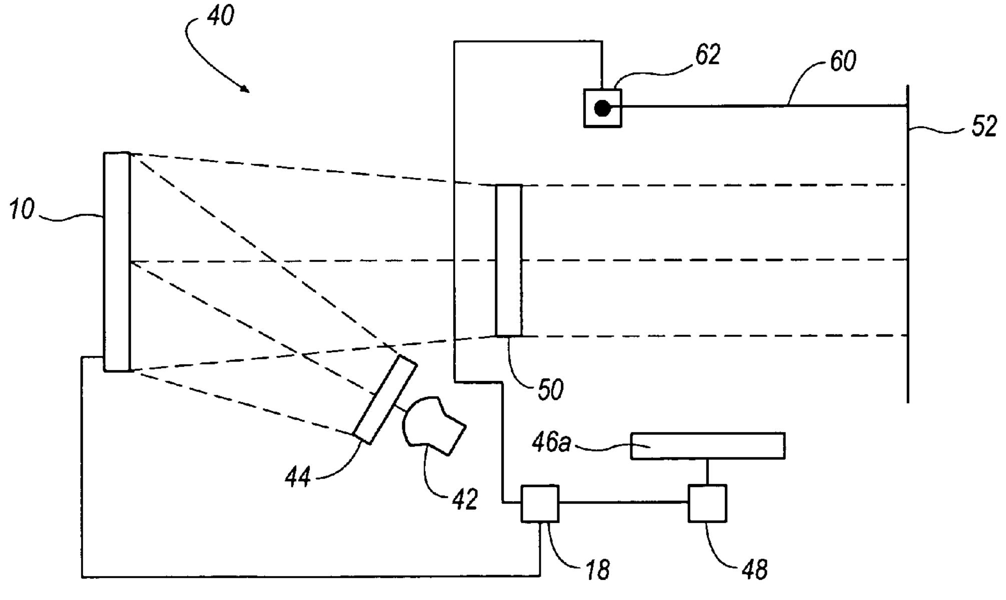
FIG. 3B is a schematic view of an embodiment of an optical display device according to an aspect of the present embodiments.

Referring now to FIGS. 3A and 3B, another embodiment of the system is shown and described, where like elements have like reference numerals (and are not again described). In FIGS. 3A and 3B, a mirror 60 is attached to a motor 62. The motor 62 is preferably a servo motor that is able to move the mirror 60 between the positions shown in FIG. 3A and FIG. 3B. The position of FIG. 3A places the mirror directly in the optical path between the array 10 and the screen 52. The position of FIG. 3B is a location outside this optical position. When the mirror 60 is moved by motor 62 into the position shown in FIG. 3B, the optical path bypasses the mirror 60 and projects light from array 10 directly onto the screen 52.

A feedback device 46*a* is positioned in the optical path defined by the mirror 60 and light illuminated by the array 10 when the mirror 60 is positioned as shown in FIG. 3A. Although this position is shown as being located downward in the Figure, one skilled in the art will readily recognize that many different arrangements of both the mirror 60 and the feedback device 46*a* may be utilized.

Figure 4:
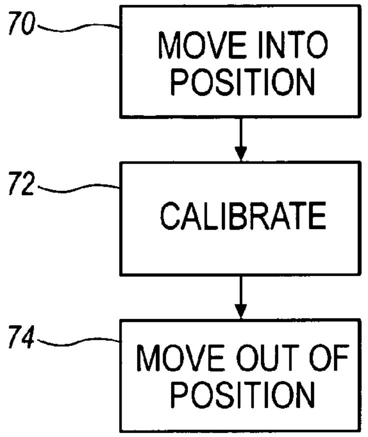
FIG. 4 is an embodiment of the flowchart depicting an operation of an embodiment of an optical display device according to an aspect of the present embodiments.

Referring now to FIG. 4, the operation of the embodiment described with reference to FIGS. 3A and 3B is described. In the process described in FIG. 4, the mirror 60 is moved into position of the optical path defined by the array 10 in step 70. The mirror 60 is moved into the shown position in FIG. 3A based on instructions dispatched from the array driver circuitry 18 to the motor 62.

The motor 62 may be driven by the array driver circuitry 18 in response to a calibration process programmed therein. In one example, the array driver circuitry 18 begins a timer after illumination source 42 initially illuminates array 10. This situation models the common scenario where the light delivery device 40 is initially turned on in anticipation of being used, i.e. a warm-up period. The time delay allows time for the array 10 to heat up to operational temperature. Once the timer reaches a predetermined time limit, the mirror 60 is moved into position shown in FIG. 3A by the motor 62. One skilled in the art will readily recognize other options for moving mirror 60 into position, such as providing a button on the side of the light delivery device 40 which allows a user to calibrate the device at any time. Other options may include providing a timer in the array driver circuitry 18 that initiates a calibration process once, every time period, such as once every year to account for slow changes in the device over long periods of time. Another embodiment may include placing a thermal sensor in the array 10, which initiates a calibration process once a predetermined temperature is reached by the array 10.

In step 72, the array driver circuitry 18 instructs each of the optical modulation elements 12*a* of the array 10 to illuminate a specific color or frequency. For example, the array driver circuitry 18 may instruct all of the optical modulation elements 12*a* to project the color red. The selected frequency is projected by the array 10, against the mirror 60, and to the feedback device 46*a*. The feedback device 46*a* then dispatches information relating to the intensity and frequency of the received light to the calibration control 48. The calibration control 48 determines a digital signal representing a mean value of the frequency spread based on the frequency and intensity read. The calibration control 48 also receives a digital signal from the array driver circuitry 18 representing the value at which the array 10 is being driven. The calibration control 48 then compares the signal received from the array driver circuitry 18 and the determined value from the feedback device 46*a* to determine an offset for the array driver circuitry 18 to drive the array 10 for obtaining the proper frequency of light from the array 10.

For example, if the calibration control 48 determines that the actual projected light from the array 10 is five hertz higher then it should be, then the calibration control 48 dispatches the signal to the array driver circuitry 18 to change the voltage supplied to reflect the middle plate 24 (see FIG. 2) on each of the optical modulation elements 12*a* of the array 10 such that the correct frequency of light is transmitted at the correct frequency.

Additionally, the same procedure can be repeated for different frequencies of light. For example, the array driver circuitry 18 can cycle between red, green and blue colors to allow the feedback device 46*a* and the calibration control 48 to generate offsets and instruct the array driver circuitry 18 to drive the optical modulation elements 12*a* of the array 10 at the proper voltages for obtaining the desired frequencies of light from the array 10.

Once an offset is determined and fed to the array driver circuitry 18, step 74 is executed and the mirror 60 is moved out of position by motor 62 as shown in FIG. 3B. Hereafter, the array 10 may be used to project images onto screen 52 as normally operated.

Figure 5:
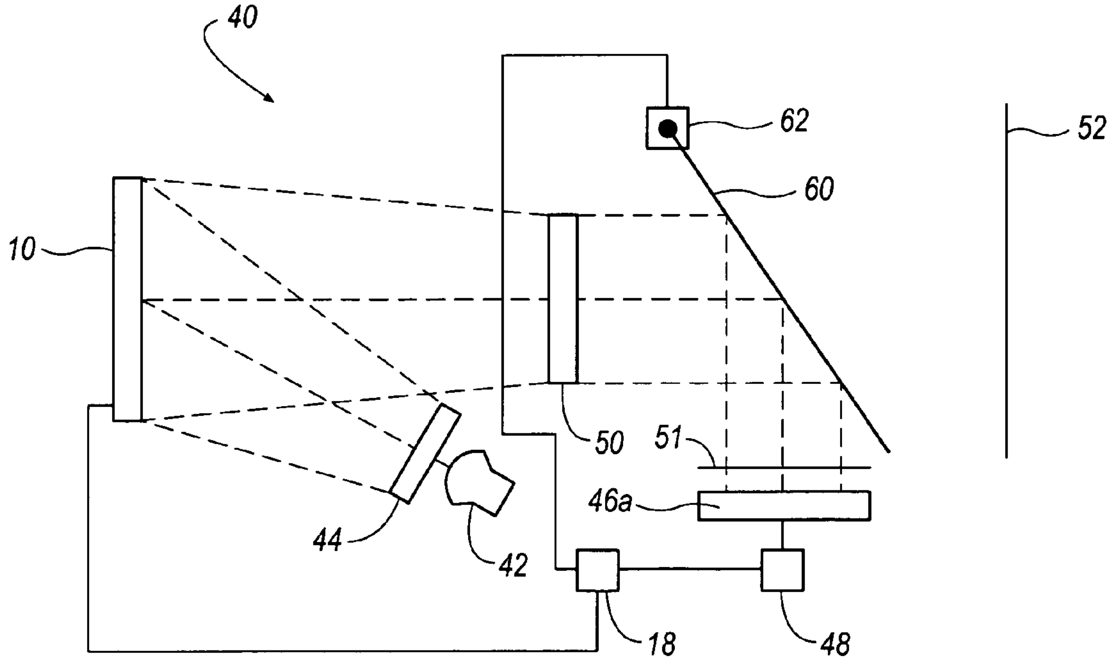
FIG. 5 is a schematic view of an embodiment of an optical display device according to an aspect of the present embodiments.

In another embodiment as depicted in FIG. 5, the feedback device 46*a* is a CCD based device. Here, as the feedback device 46*a* is divided into pixel elements, calibration may be carried out for each individual optical modulation element of the array 10. A filter arrangement 51 is positioned directly adjacent to the feedback device 46*a* along the optical path. The CCD feedback device 46*a* captures the frequency of light emanated from each optical modulation element 12*a* of the array 10 and feeds this information into calibration control 48. The filter arrangement 51 indexes specific filters in front of the feedback device 46*a* to determine the specific frequency of light that each optical modulation element 12*a* of the array 10 is transmitting. For example, the filter arrangement 51 can begin with a low-frequency filter and continuously index toward a higher frequency filter. Once the correct filter is positioned in front of the feedback device 46*a* for certain optical modulation elements 12*a*, then the corresponding pixels for feedback device 46*a* receives an illumination input indicating that the corresponding filter corresponds to the correct frequency of light being transmitted. This information can be transmitted to the calibration control 48 as indicating the frequency of light that the array 10 is projecting. One skilled in the art will readily recognize other scenarios for determining the frequency of light being transmitted by the array 10, including "painting" each individual pixel with a different color filter.

As the information is derived from a pixel related device such as a CCD, the information fed to the calibration control 48 can be addressed with respect to either each specific optical modulation element 12*a* that projected the light or groups or quadrants of optical modulation elements 12*a*. Calibration control 48 also receives information from array driver circuitry 18 representing the voltage being applied to each optical modulation element 12*a*. The calibration control 48 then compares the illumination and intensity read from each optical modulation element 12*a* with that provided by the array driver circuitry 18 and then determines an offset for each optical modulation element 12*a*. By this way, specific offsets may be determined for each individual optical modulation element 12*a* or groups or quadrants of optical modulation elements 12*a*.

Figure 6:
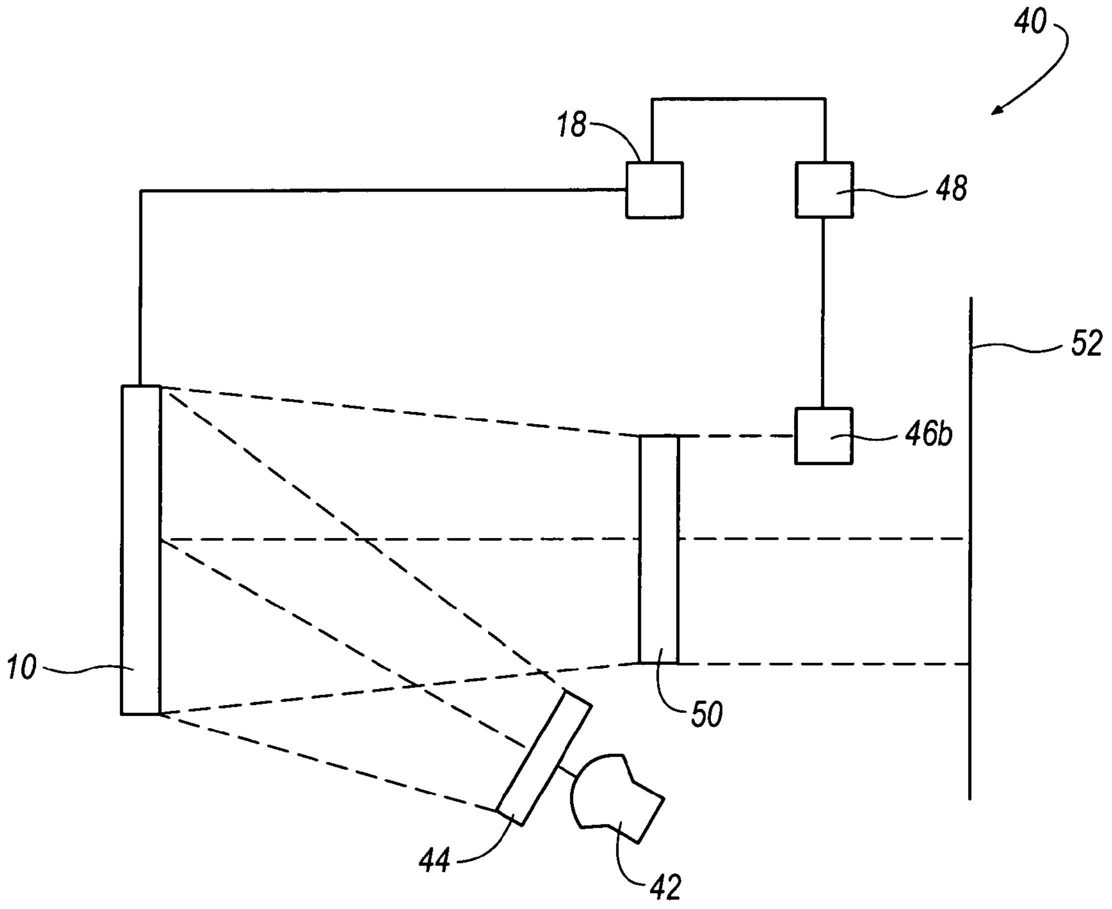
FIG. 6 is a schematic view of an embodiment of an optical display device according to an aspect of the present embodiments.

Referring now to FIG. 6, another embodiment is shown and described. In FIG. 6, a feedback device 46*b* is positioned in an optical path defined by array 10, focusing element 50 and screen 52. However, the feedback device 46 is positioned in only a portion of the optical path so as not to obstruct or obscure the projected image by array 10 onto screen 52. As a result of this positioning, the feedback device 46 may stay in the optical path even during normal operation of the light delivery device 40. The optical modulation elements 12*a* which project light onto the feedback device 48*b*, project a specific frequency of light as defined by the array driver circuitry 18. As before, the feedback device 46*b* reads the intensity and frequency of this light, compares it to information provided by the array driver circuitry 18, and then determines an offset for the array driver circuitry 18. The optical modulation elements 12*a* which project light onto the feedback device 48*b* may either project the desired frequencies of light only during a calibration process, or may project this particular frequency of light during the entire operation of the array 10.

Figure 7:
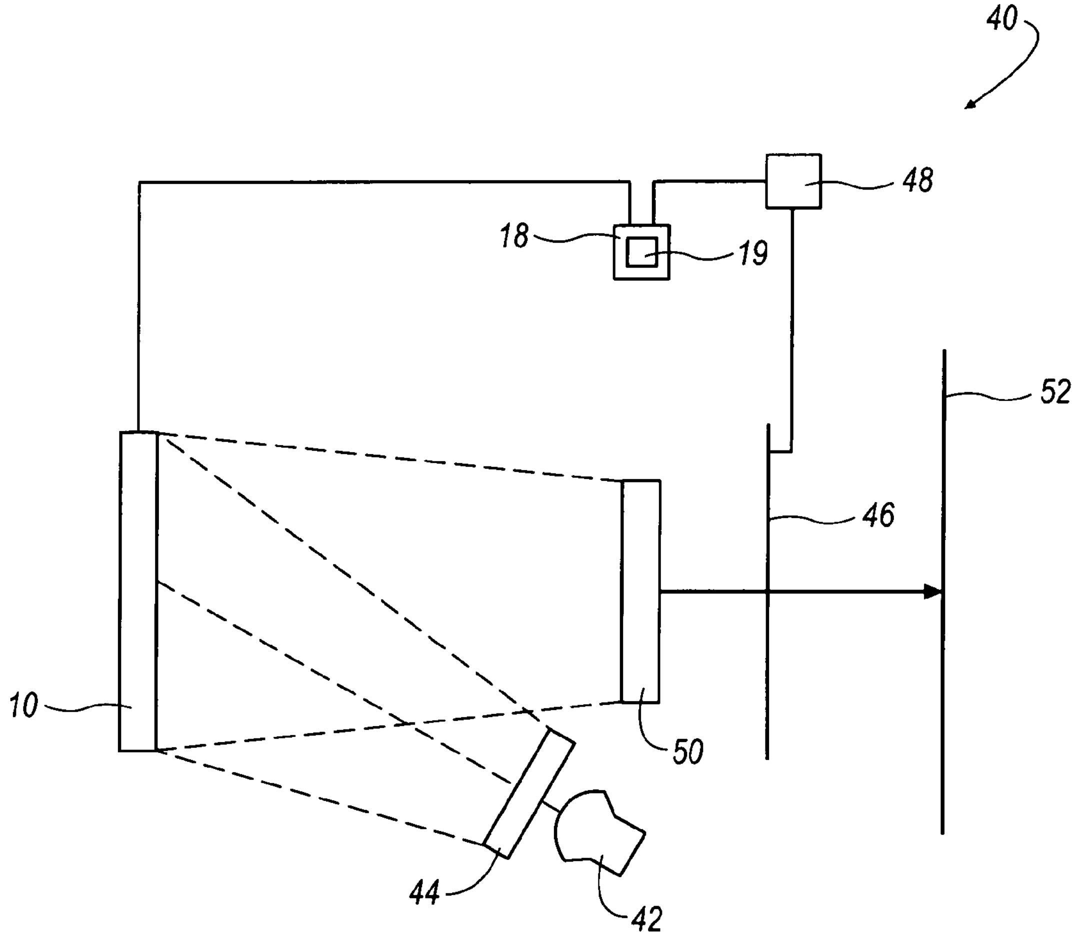
FIG. 7 is a schematic view of an embodiment of an optical display device according to an aspect of the present embodiments.

Referring now to FIG. 7, another embodiment is shown and described. In FIG. 7, the array driver circuitry 18 includes a memory storage area 19. The memory storage area 19 can be a RAM, ROM, DRAM, SRAM, fuse or other known memory storage device. The memory storage area 19 is adapted to store specific illumination settings for the optical modulation elements 12*a*.

The embodiment depicted in FIG. 7 lends itself to compensating for defects in the array 10 created during the manufacturing process. Specifically, during manufacturing, variations in the overall thickness of the array 10 may result due to normal manufacturing processes, to thereby cause optical modulation elements 12*a* to illuminate with a different frequency or color than was intended to be projected by the array driver circuitry 18. Accordingly, to compensate for these variations, feedback device 46 is positioned along the optical path from the array 10 during one of the many manufacturing steps typically required to manufacture and assemble all the components of the light delivery device 40. For example, after all the components of the light delivery device 40 are installed, the feedback device 46 is positioned along the optical path to effectuate a final test of all the components of light delivery device 40.

Once in position, the feedback device 46 determines the frequency of the light projected from array 10 as described in any of the preceding embodiments. For example, the array driver circuitry 18 instructs each of the optical modulation elements 12*a* to project a specific desired frequency of light such as red. Calibration control 48 receives information representing the actual frequency and intensity from the optical modulation elements 12*a* of the array 10. The calibration control 48 then compares this information with the intended frequency that array driver circuitry 18 intended the optical modulation elements 12*a* of the array 10 to produce. Calibration control 48 compares the intended frequency sent from array driver circuitry 18 with the actual frequency read by feedback device 46 to determine an offset. The offset is then stored in memory storage area 19 and is referenced every time the light delivery device 40 is used to project light. In this way, variations in the array 10 caused by the manufacturing process may be compensated by simply storing a desired offset in the memory storage device 19 and referencing that offset every time the light delivery device 40 is used.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A light delivery device comprising:

a display device defining an optical path of light;

a system adapted to drive the display device with at least one predefined voltage intended to elicit at least one desired frequency of light from the display device;

a feedback device adapted to be positioned along the optical path of light;

wherein the system is adapted to receive information from the feedback device representing an actual frequency of light generated by the display device and to compare the actual frequency with the desired frequency to determine an offset; and wherein the system is adapted to cause the display device to be driven based on the offset.

2. The light delivery device according to claim 1, further comprising:

an illumination source projecting light onto an array of optical modulation elements to define the optical path; and wherein the display device is adapted to reflect desired frequencies of light based on the predefined voltage supplied from the system.

3. The light delivery device according to claim 1, wherein the system further includes:

a calibration control adapted to drive the display device with the predefined voltage;

an array driver circuitry;

wherein the calibration control device receives the information from the feedback device and receives driver information representing the desired frequency from the array driver circuitry;

wherein the calibration control determines the offset based on the information from the feedback device and the driver information; and wherein the array driver circuitry is adapted to drive the display device with a new voltage based on the offset.

4. The light delivery device according to claim 1, wherein the information from the feedback device is intensity and frequency information of light read by the feedback device.

5. The light delivery device according to claim 4, wherein the system is adapted to determine a mean value of the frequency of light read by the feedback device based on the intensity and frequency information.

6. The light delivery device according to claim 1, wherein the feedback device is positioned along only a portion of a cross-section of the optical path to read only a portion of light emitted from the display device.

7. The light delivery device according to claim 1, further comprising:

a motor electrically connected to the system;

a mirror connected to the motor;

wherein the motor is adapted to move the mirror between a first position and a second position;

wherein the first position locates the mirror out of the optical path; and wherein the second position locates the mirror in the optical path and directs light from the display device to the feedback device.

8. The light delivery device according to claim 7, wherein the system is adapted to:

initiate a timer;

instruct the motor to move the mirror to the second position after the timer passes a predetermined time;

determine the offset; and instruct the motor to move the mirror to the first position after the offset has been determined.

9. The light delivery device according to claim 1, wherein the display device comprises a plurality of optical modulation elements organized into an array.

10. The light delivery device according to claim 9, wherein the system is adapted to instruct each of the optical modulation elements to emit a same desired frequency before determining the offset.

11. The light delivery device according to claim 1, wherein:

the display device comprises a plurality of optical modulation elements organized into an array, each of the optical modulation elements comprising:

an outer semitransparent plate;

a reflective middle plate positioned substantially parallel to and spaced from the semitransparent plate;

a lower plate connected to a first potential; and at least one spring positioned between the at least one reflective middle plate and the lower plate;

wherein the reflective middle plate connects to the system to generate a capacitance between the reflective middle plate and the first potential and move the reflective middle plate to a position defining a distance between the reflective middle plate and the outer semitransparent plate; and wherein the distance between the reflective middle plate and the outer semitransparent plate defines the desired frequency.

12. The light delivery device according to claim 1, wherein the system is adapted to effectuate calibration of the display device during a step of a manufacturing process.

13. The light delivery device according to claim 1, further comprising a thermal sensor in thermal contact with the display device.

14. The light delivery device according to claim 13, wherein the system is responsive to the thermal sensor to determine the offset when the thermal sensor detects that the display device has reached a predetermined temperature.

15. A method for calibrating a display device, comprising:

positioning a feedback device along an optical path from the display;

reading illumination characteristics from the display device with the feedback device;

determining a desired frequency of light projected from the display device;

determining an actual frequency of light projected from the display device based on the illumination information;

determining an offset based on a difference between the desired frequency and the actual frequency; and driving the display device based on the offset.

16. The method according to claim 15, wherein the illumination information is an intensity and frequency of light projected from the display device.

17. The method according to claim 16, wherein the step of determining the actual frequency of light further comprises:

determining a peak value of the intensity of the illumination characteristics;

determining a frequency range of the illumination characteristics; and determining a mean value of the actual frequency based on the intensity and the frequency.

18. The method according to claim 15, wherein the step of positioning further comprise moving a mirror into the optical path to direct light from the display device to the feedback device.

19. The method according to claim 18, further comprising:

initiating a timer;

moving the mirror into the optical path after a predetermined amount of time has elapsed;

determining the offset; and moving the mirror out of the optical path.

20. The method according to claim 18, further comprising:

sensing a temperature of the display;

moving the mirror into the optical path when the temperature of the display reaches a predetermined temperature;

determining the offset; and moving the mirror out of the optical path.

21. The method according to claim 15, wherein the display device comprises a plurality of optical modulation elements organized into an array.

22. The method according to claim 21, wherein the system instructs each of the optical modulation elements to emit a same desired frequency before determining the offset.

23. The method according to claim 15, wherein:

the display device comprises a plurality of optical modulation elements organized into an array, each of the optical modulation elements comprising:

an outer semitransparent plate;

a reflective middle plate positioned substantially parallel to and spaced from the semitransparent plate;

a lower plate connected to a first potential; and at least one spring positioned between the at least one reflective middle plate and the lower plate;

wherein the reflective middle plate connects to the system to generate a capacitance between the reflective middle plate and the first potential and move the reflective middle plate to a position defining a distance between the reflective middle plate and the outer semitransparent plate; and wherein the distance between the reflective middle plate and the outer semitransparent plate defines the desired frequency.

24. The method according to claim 15, wherein the step of positioning is performed during a step in a manufacturing process.

25. The method according to claim 15, wherein the reading step is performed on only a portion of light along a cross-section of the optical path generated by the display.

26. The method according to claim 15, wherein the display device comprises a plurality of diffractive based light devices.

27. A light delivery device comprising:

a display device means for defining an optical path of light;

a system means for driving the display device means with at least one predefined voltage to elicit at least one desired frequency of light from the display device means;

a feedback device means positioned along the optical path of light for reading a frequency of light from the display device means;

wherein the system means is for receiving information from the feedback device means representing a actual frequency of light read from the display device means and comparing the actual frequency with the desired frequency to determine an offset; and wherein the system means is for effectuating calibration of the display device means to drive the display device means based on the offset.

28. The light delivery device according to claim 27, further comprising:

an illumination source means for projecting light onto an array of optical modulation elements to define the optical path; and wherein the display device means is for reflecting desired frequencies of light based on the predefined voltage supplied from the system means.

29. The light delivery device according to claim 27, wherein the system means further includes:

a calibration control means for driving the display device means with the predefined voltage;

an array driver circuitry means for generating driver information representing a desired frequency for display by the display device means;

wherein the calibration control means is for receiving the information from the feedback device means and receiving the driver information from the array driver circuitry and determining the offset; and wherein the array driver circuitry means is for driving the display device with a new voltage based on the offset.

30. The light delivery device according to claim 27, wherein the information from the feedback device means is intensity and frequency information of light read by the feedback device.

31. The light delivery device according to claim 30, wherein the system means is for determining a mean value of the frequency of light read by the feedback device means based on the intensity and frequency information.

32. The light delivery device according to claim 27, wherein the feedback device means is positioned along only a portion of a cross-section of the optical path to read only a portion of light emitted from the display device means.

33. The light delivery device according to claim 27, further comprising to a mirror means for directing light between a first direction not at the feedback device and a second direction toward the feedback device.

34. The light delivery device according to claim 33, wherein the display device means comprises a plurality of optical modulation element means organized into an array and for generating light.

35. The light delivery device according to claim 27, further comprising a thermal sensor means for determining the offset.

* * * * *